(12) United States Patent
Gosselink et al.

(10) Patent No.: US 9,169,444 B2
(45) Date of Patent: Oct. 27, 2015

(54) LIQUID FUEL COMPOSITION

(75) Inventors: Johan Willem Gosselink, Amsterdam (NL); John William Harris, Amsterdam (NL); Andries Hendrik Janssen, Amsterdam (NL); Richard John Price, Chester (GB); Colin John Schaverien, Amsterdam (NL); Nicolaas Wilhelmus Joseph Way, Amsterdam (NL)

(73) Assignee: Shell Oil Company, Houston, TX (US)

( * ) Notice: Subject to any disclaimer, the term of this patent is extended or adjusted under 35 U.S.C. 154(b) by 388 days.

(21) Appl. No.: 13/453,845

(22) Filed: Apr. 23, 2012

(65) Prior Publication Data

US 2012/0266838 A1 Oct. 25, 2012

(30) Foreign Application Priority Data

Apr. 21, 2011 (EP) .................................. 11163544

(51) Int. Cl.
| | | |
|---|---|---|
| *C10G 3/00* | (2006.01) | |
| *C10G 1/08* | (2006.01) | |
| *C10L 1/06* | (2006.01) | |
| *C10L 1/02* | (2006.01) | |
| *C10L 1/16* | (2006.01) | |
| *C10L 1/14* | (2006.01) | |
| *C10L 1/18* | (2006.01) | |
| *C10L 1/182* | (2006.01) | |
| *C10L 1/183* | (2006.01) | |
| *C10L 1/185* | (2006.01) | |
| *C10L 1/19* | (2006.01) | |

(52) U.S. Cl.
CPC .. *C10G 3/57* (2013.01); *C10G 1/08* (2013.01); *C10G 3/42* (2013.01); *C10L 1/023* (2013.01); *C10L 1/06* (2013.01); *C10L 1/16* (2013.01); *C10L 1/1616* (2013.01); *C10G 2300/104* (2013.01); *C10G 2300/1011* (2013.01); *C10G 2300/1022* (2013.01); *C10G 2300/301* (2013.01); *C10G 2300/305* (2013.01); *C10G 2300/80* (2013.01); *C10G 2400/02* (2013.01); *C10L 1/14* (2013.01); *C10L 1/1691* (2013.01); *C10L 1/18* (2013.01); *C10L 1/1824* (2013.01); *C10L 1/1832* (2013.01); *C10L 1/1852* (2013.01); *C10L 1/19* (2013.01); *C10L 2200/0415* (2013.01); *C10L 2200/0423* (2013.01); *C10L 2200/0469* (2013.01); *C10L 2200/0492* (2013.01); *C10L 2270/023* (2013.01)

(58) Field of Classification Search
CPC .......... F02B 43/10; F02M 25/00; C10G 3/57; C10G 1/08; C10G 3/42; C10G 2300/1011; C10G 2300/1022; C10G 2300/301; C10G 2300/305; C10G 2400/02; C10L 1/06; C10L 1/023; C10L 1/16; C10L 1/1616

USPC ....... 123/1 A, 575; 585/14; 44/447, 451, 572, 44/303
See application file for complete search history.

(56) References Cited

U.S. PATENT DOCUMENTS

| 4,851,109 | A | 7/1989 | Chen et al. | |
|---|---|---|---|---|
| 2008/0022595 | A1 | 1/2008 | Lemaire et al. | |
| 2008/0216655 | A1 | 9/2008 | Vimalchand et al. | |
| 2009/0013603 | A1 | 1/2009 | Rolland | |
| 2009/0253948 | A1* | 10/2009 | McCall et al. ................ | 585/240 |
| 2009/0283445 | A1 | 11/2009 | Tammera et al. | |
| 2010/0105970 | A1* | 4/2010 | Yanik et al. ................... | 585/240 |

FOREIGN PATENT DOCUMENTS

| EP | 0231163 | 8/1987 |
|---|---|---|
| EP | 322305 | 6/1989 |
| EP | 705321 | 1/1995 |
| EP | 649896 | 4/1995 |
| EP | 0668342 | 8/1995 |
| EP | 0699225 | 3/1996 |
| EP | 994173 | 4/2000 |
| EP | 1803019 | 7/2007 |
| EP | 1892280 | 2/2008 |
| EP | 2108637 | 10/2009 |
| GB | 2166663 | 5/1986 |
| GB | 2371807 | 8/2002 |
| GB | 2386607 | 9/2003 |
| GB | 2447684 | 9/2008 |
| WO | 9321139 | 10/1993 |
| WO | 9426848 | 11/1994 |
| WO | 9500604 | 1/1995 |
| WO | 9718278 | 5/1997 |
| WO | 02070630 | 9/2002 |
| WO | 2006031011 | 3/2006 |
| WO | 2007090884 | 8/2007 |
| WO | 2009143017 | 11/2009 |
| WO | 2010062611 | 6/2010 |

(Continued)

OTHER PUBLICATIONS

Biomass derived feedstock co-processing with vacuum gas oil for second-generation fuel production in FCC units. Fogassy et al. Mar. 9, 2010.*

(Continued)

*Primary Examiner* — Cephia D Toomer

(57) ABSTRACT

A liquid fuel composition containing a biofuel component, produced from a fraction of one or more cracking products produced by catalytic cracking of a biomass source. The liquid fuel composition contains in the range of 0.5 to 20 vol. % of C4-C8-olefins, which C4-C8-olefins contain in the range from equal to or more than 0.02 wt % to equal to or less than 100 wt % of bio-carbon, based on the total weight of carbon present in the C4-C8-olefins.

14 Claims, No Drawings

(56) References Cited

FOREIGN PATENT DOCUMENTS

| WO | 2010068255 | 6/2010 |
|---|---|---|
| WO | 2010135734 | 11/2010 |
| WO | 2010062611 | 6/2011 |

OTHER PUBLICATIONS

European Search Report dated Nov. 16, 2011, Application No. 11163411.9-2104.

Lappas A. A. et al., "Biomass Pyrolysis in a Circulating Fluid Bed Reactor for the Production of Fuels and Chemicals", Fuel, Greece, vol. 81, No. 16, 2002, pp. 2087-2095.

Sadeghbeigi R., Fluid Catalytic Cracking Handbook, Design, Operation, & Troubleshooting of FCC Facilities, Gulf Publishing Co., 1995, pp. 219-223.

Zhang Q. et al, "Review of Biomass Pyrolysis Oil Properties and Upgrading Research", ScienceDirect, Energy Conversion & Management, Oxford, GB, vol. 48, No. 1, 2007, pp. 87-92.

Corma, A. et al.; "Processing Biomass-Dervied Osygenates in the Oil Refinery: Cataystic Cracking (FCC) Reaction Pathways and Role of Catalyst", Journal of Catalysis, vol. 247, pp. 307-327 (2007).

Schoenmakers, P. J. et al., "Comparison of Compreensive Two-Dimensional Gas Chromatography and Gas Chromatograpy—Mass Spectrometry for the Characterization of Complex Hydrocarbon Mixtures", Journal of Chromatography A, (2000) vol. 892, pp. 29-46.

French, R. et al., "Catalytic Pyrolysis of Biomass for Biofuels Production", FuelL Processing Technology, Elsevier BV [NL], vol. 91, No. 1, Jan. 2010, pp. 25-32.

Huber G. W. et al., "Biorefineries-Synergies between Bio and Oil Refineriers for the Poduction of Fuels from Biomass", Angewandte Chemie International Ed., (2007) vol. 46; pp. 7184-7201.

Kyung-Hae, Lee et al., "Influence of Reaction Temperature, Pretreatment, and a Char Removal System on the Production of Bio-oil from Rice Straw by Fast Pyrolysis, Using a Fluidized Bed", Energy & Fuels, vol. 19, No. 5, Sep. 2005, pp. 2179-2184.

Meier, W. M. et al., Atlas of Zeolite Structure Types; 4th Rev. Ed., Zeolites (1996) vol. 17, pp. 1-230.

Magee, J. S. et al., Fluid Catalytic Cracking, Science & Technology, 1993, pp. 391.

Wilson, J. W., "Fluid Catalytic Cracking Technology and Operations", PennWell Publishing Co., (1997) Chapter 4, pp. 1131-1155.

Wilson, J. W., "Fluid Catalytic Cracking Technology and Operations", PennWell Publishing Co. (1997), Chapter 3, pp. 101-112.

Wilson, J. W.,"Fluid Catalytic Cracking; Design, Operation, and Troubleshooting of FCC Facilities", Reza Sadeghbeigi, published by Gulf Publishing Co., Houston Texas (1995), especially pp. 219-223.

Wilson, J. W.,"Fluid Catalytic 30 Cracking Technology and Operations", PennWell Publishing Co. (1997), Chapter 8, especially pp. 223 to 235.

International Search Report dated Jul. 10, 2012, Application No. PCT/EP2012/057369 filed Apr. 23, 2012 (5 pages).

International Search Report dated Jul. 25, 2012, Application No. PCT/EP2012/057414 filed Apr. 23, 2012 (5 pages).

International Search Report dated Jul. 25, 2012, Application No. PCT/EP2012/057371 filed Apr. 23, 2012 (7 pages).

\* cited by examiner

LIQUID FUEL COMPOSITION

The present application claims the benefit of European Patent Application No. 11163544.7, filed Apr. 21, 2011 the entire disclosure of which is hereby incorporated by reference.

FIELD OF THE INVENTION

The invention relates to a liquid fuel composition, a method for preparation thereof, a method for operating an engine using the liquid fuel composition and use of the liquid fuel composition in a transportation vehicle.

BACKGROUND OF THE INVENTION

With the diminishing supply of crude mineral oil, use of renewable energy sources, such as biomass sources, is becoming increasingly important for the production of liquid fuels. These fuels from biomass sources are often referred to as biofuels.

Although a variety of biofuels can be produced from biomass sources, such as ethanol, methanol, biodiesel, Fischer-Tropsch diesel and kerosene, and gaseous fuels, such as hydrogen and methane, these fuels may require either new distribution technologies and/or new combustion technologies appropriate for their characteristics. The production of these fuels also tends to be expensive.

It would be an advancement in the art to provide a liquid biofuel composition that can be produced and handled by the existing infrastructure and combustion technologies. In addition it would be advantageous to provide liquid fuel compositions that may be suitable for the existing vehicles tank and fuel delivery systems.

WO2010/135734 describes a method for catalytically cracking a biomass feedstock and a refinery feedstock in a refinery unit having a fluidized reactor. WO2010/135734 further describes that a liquid product or a fraction thereof can be used or sold as a final product and/or can be subject to further processing/upgrading to produce a fuel or specialty chemical. WO2010/135734, however, does not disclose fuel products which are ready to be produced and/or used in the existing infrastructure and combustion technologies.

WO 2010/062611 describes a method for converting solid biomass to hydrocarbons requiring three catalytic conversion steps. First the solid biomass is contacted with a catalyst in a first riser operated at a temperature in the range of from about 50 to about 200° C. to produce a first biomass-catalyst mixture and a first product comprising hydrocarbons (referred to as pretreatment). Hereafter the first biomass-catalyst mixture is charged to a second riser operated at a temperature in the range of from about 200° to about 400° C. to thereby produce a second biomass-catalyst mixture and a second product comprising hydrocarbons (referred to as deoxygenating and cracking); and finally the second biomass-catalyst mixture is charged to a third riser operated at a temperature greater than about 450° C. to thereby produce a spent catalyst and a third product comprising hydrocarbons. The last step is referred to as conversion to produce the fuel or specialty chemical product. WO 2010/062611 mentions the possibility of preparing the biomass for co-processing in conventional petroleum refinery units. The process of WO 2010/062611, however, is cumbersome in that three steps are needed, each step requiring its own specific catalyst. WO 2010/062611 mentions the possibility of blending the first product, the second product and the third product together to form a final product comprising components selected from the group consisting of ethane, propane, butane and hydrocarbons boiling in the range of naphtha, jetfuel, diesel, heating oil and combinations thereof. This final product formed in WO 2010/062611 is, however, not ready for use in for example a transportation vehicle. WO 2010/062611 does not disclose fuel products which are ready to be produced and/or used in the existing infrastructure and combustion technologies.

It would be an advancement in the art to provide biofuel compositions, which can be produced and handled by the existing infrastructure and/or combustion technologies and/or existing vehicles tank and/or fuel delivery systems.

SUMMARY OF THE INVENTION

It has now been found that with specific fractionation and optionally hydrotreatment steps, the product of catalytically cracking biomass sources, can be used to prepare a liquid fuel composition that can be produced and handled by the existing infrastructure and combustion technologies. In addition the liquid fuel composition may be suitable for the existing vehicles tank and fuel delivery systems.

Accordingly, in an embodiment provides a liquid fuel composition comprising a biofuel component, which biofuel component comprises or is derived from a fraction of one or more cracking products produced by catalytic cracking of a biomass source, wherein the fraction is chosen from the group consisting of light cycle oil, naphtha products, fractions thereof and/or mixtures thereof.

In another embodiment a liquid fuel composition for a spark-ignition engine is provided containing, in the range of 0.5 to 20 vol % of C4-C8-olefins, which C4-C8-olefins contain in the range from equal to or more than 0.02 wt % to equal to or less than 100 wt % of bio-carbon, based on the total weight of carbon present in the C4-C8-olefins.

The biofuel component and/or C4-C8-olefins can be at least partly produced by contacting a biomass material with a catalytic cracking catalyst at a temperature of more than 400° C. in a catalytic cracking reactor to prepare one or more cracked products and subsequently fractionating the one or more cracked products to prepare light cycle oil, light-light-cycle oil, cat-cracked gasoline, and/or light cat-cracked gasoline.

Therefore, in another embodiment also provides a process of preparing a liquid fuel composition comprising
a) contacting a biomass material with a catalytic cracking catalyst at a temperature of more than 400° C. in a catalytic cracking reactor to obtain one or more cracked products;
b) fractionating the one or more cracked products to obtain a fraction chosen from the group consisting of light cycle oil, naphtha products, fractions thereof and mixtures thereof;
c) using the fraction obtained in step b) as a biofuel component and/or converting the fraction obtained in step b) to a biofuel component; and
d) blending the biofuel component with one or more other components to obtain a liquid fuel composition.

In yet another embodiment, the liquid fuel compositions can be used in a method for operating an engine or heating appliance and/or can be advantageously used in a transportation vehicle.

The liquid fuel compositions may advantageously be produced and handled by the existing infrastructure and/or combustion technologies.

In addition the liquid fuel compositions advantageously allow part of the fossil $CO_2$ emissions to be replaced by sustainable or so-called "green" $CO_2$ emissions, thereby reducing the total emission of fossil $CO_2$.

DETAILED DESCRIPTION OF THE INVENTION

Methods of preparing a liquid fuel composition is provided. The liquid fuel composition may be prepared by:
a) contacting a biomass material with a catalytic cracking catalyst at a temperature of more than 400° C. in a catalytic cracking reactor to obtain one or more cracked products;
b) fractionating the one or more cracked products to obtain a fraction chosen from the group consisting of light cycle oil, naphtha products, fractions thereof and mixtures thereof;
c) using the fraction obtained in step b) as a biofuel component and/or converting the fraction obtained in step b) to a biofuel component; and
d) blending the biofuel component with one or more other components to obtain a liquid fuel composition.

In a preferred embodiment step a) comprises co-processing of a biomass material and a fluid hydrocarbon co-feed in a catalytic cracking reactor. That is, preferably step a) comprises contacting a biomass material and a fluid hydrocarbon feed with a catalytic cracking catalyst at a temperature of more than 400° C. in a catalytic cracking reactor to obtain one or more cracked products. As described in more detail herein below, the fluid hydrocarbon feed is preferably derived from a conventional crude oil.

By a biomass material is herein understood a material obtained from a renewable source. By a renewable source is herein understood a composition of matter of biological origin as opposed to a composition of matter obtained or derived from petroleum, natural gas or coal. Without wishing to be bound by any kind of theory it is believed that such material obtained from a renewable source may preferably contain carbon-14 isotope in an abundance of about 0.0000000001%, based on total moles of carbon.

Preferably the renewable source is a composition of matter of cellulosic or lignocellulosic origin.

Any biomass material may be used in the process of the invention. Examples of suitable biomass materials include triglycerides; pyrolysis oils; so-called liquefied biomass; solid biomass material; and/or mixtures thereof.

Examples of suitable triglyceride-containing biomass materials include vegetable oils and animal fat. Examples of suitable vegetable oils include palm oil, rapeseed oil, coconut oil, corn oil, soya oil, safflower oil, sunflower oil, linseed oil, olive oil and peanut oil. Examples of suitable animal fats include pork lard, beef fat, mutton fat and chicken fat.

Pyrolysis oils may for example be obtained by treatment of a solid biomass material, such as for example wood or straw, at a temperature equal to or above 400° C., in the presence or in the essential absence of a catalyst, and in an oxygen-poor, preferably an oxygen-free, atmosphere. More preferably the temperature lies in the range from equal to or more than 480° C. to equal to or less than 520° C. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

A so-called liquefied biomass may for example be obtained by liquefaction of solid biomass material such as for example a cellulose or lignocellulose containing material, comprising contacting the cellulose or lignocellulose containing material with a liquid solvent at a temperature of equal to or more than 200° C.; or contacting the cellulose or lignocellulose containing material with a liquid solvent at a temperature of equal to or more than 100° C. in the presence of a catalyst, to produce a liquefied product.

Preferably, however, the biomass material is a solid biomass material and/or a pyrolysis oil, most preferably a solid biomass material. More preferably this solid biomass material is not a material used for food production. Examples of preferred solid biomass materials include aquatic plants and algae, agricultural waste and/or forestry waste and/or paper waste and/or plant material obtained from domestic waste.

Preferably the solid biomass material contains cellulose and/or lignocellulose. Examples of suitable cellulose- and/or lignocellulose-containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the solid biomass material is selected from the group consisting of wood, sawdust, straw, grass, bagasse, corn stover and/or mixtures thereof.

Such solid biomass materials are advantageous as they do not compete with food production and are therefore considered more sustainable. In addition, without wishing to be bound by any kind of theory, it is believed that feeding of solid biomass materials into a catalytic cracking reactor results in increased production of olefins containing bio-carbon. It is believed that conversion of the solid biomass materials results in in-situ water formation during step a). The in-situ water formation may lower the hydrocarbon partial pressure, preferably to a hydrocarbon partial pressure in the range from 0.7 to 2.8 bar absolute (0.07 to 0.28 MegaPascal), more preferably 1.2 to 2.8 bar absolute (0.12 to 0.28 MegaPascal). This in turn is believed to reduce second order hydrogen transfer reactions, thereby resulting in higher olefin yields.

Any solid biomass material may have undergone drying, torrefaction, steam explosion, particle size reduction, densification and/or pelletization before being contacted with the catalyst, to allow for improved process operability and economics.

Preferably any solid biomass material is a torrefied solid biomass material. The torrefied solid biomass material can be produced by torrefying the solid biomass material at a temperature of more than 200° C. The words torrefying and torrefaction are used interchangeable herein.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar, corresponding to about 0.1 MegaPascal). In addition, the torrefying step may be carried out batchwise or continuously.

The torrefied solid biomass material has a higher energy density, a higher mass density and greater flowability, making it easier to transport, pelletize and/or store. Being more brittle, it can be easier reduced into smaller particles.

In a further embodiment any torrefying or torrefaction further comprises drying the solid biomass material before such solid biomass material is torrefied. In such a drying step, the solid biomass material is preferably dried until the solid biomass material has moisture content in the range of equal to or more than 0.1 wt % to equal to or less than 25 wt %.

Preferably any solid biomass material is a micronized solid biomass material. By a micronized solid biomass material is herein understood a solid biomass material that has a particle size distribution with a mean particle size in the range from equal to or more than 5 micrometer to equal to or less than 5000 micrometer, as measured with a laser scattering particle size distribution analyzer. In a preferred embodiment the micronized solid biomass material is produced by reducing the particle size of the solid biomass material, optionally before or after such solid biomass material is torrefied. Such a particle size reduction may for example be especially advantageous when the solid biomass material comprises wood or torrefied wood. The particle size of the, optionally torrefied, solid biomass material can be reduced in any manner known to the skilled person to be suitable for this purpose. Suitable methods for particle size reduction include crushing, grinding and/or milling. The particle size reduction may preferably be achieved by means of a ball mill, hammer mill, (knife) shredder, chipper, knife grid, or cutter.

Preferably the solid biomass material has a particle size distribution where the mean particle size lies in the range from equal to or more than 5 micrometer (micron), more preferably equal to or more than 10 micrometer, even more preferably equal to or more than 20 micrometer, and most preferably equal to or more than 100 micrometer to equal to or less than 5000 micrometer, more preferably equal to or less than 1000 micrometer and most preferably equal to or less than 500 micrometer.

For practical purposes the particle size distribution and mean particle size of the solid biomass material can be determined with a Laser Scattering Particle Size Distribution Analyzer, preferably a Horiba LA950, according to the ISO 13320 method titled "Particle size analysis—Laser diffraction methods".

In addition to the, preferably solid, biomass material preferably also a fluid hydrocarbon feed (herein also referred to as fluid hydrocarbon co-feed) may be contacted with the catalytic cracking catalyst in the catalytic cracking reactor.

By a hydrocarbon feed is herein understood a feed that contains one or more hydrocarbon compounds. By hydrocarbon compounds are herein understood compounds that contain both hydrogen and carbon and preferably consist of hydrogen and carbon. By a fluid hydrocarbon feed is herein understood a hydrocarbon feed that is not in a solid state. The fluid hydrocarbon co-feed is preferably a liquid hydrocarbon co-feed, a gaseous hydrocarbon co-feed, or a mixture thereof. The fluid hydrocarbon co-feed can be fed to a catalytic cracking reactor in an essentially liquid state, in an essentially gaseous state or in a partially liquid-partially gaseous state. When entering the catalytic cracking reactor in an essentially or partially liquid state, the fluid hydrocarbon co-feed preferably vaporizes upon entry and preferably is contacted in the gaseous state with the catalytic cracking catalyst and/or the solid biomass material.

For hydrocarbon co-feeds that are highly viscous, it may be advantageous to preheat such feeds before entering the catalytic cracking reactor. For example, hydrocarbon co-feeds such as a long residue, a vacuum gas oil and/or mixtures thereof may be preheated to a temperature equal to or above 250° C.

The fluid hydrocarbon feed can be any non-solid hydrocarbon feed known to the skilled person to be suitable as a feed for a catalytic cracking unit. The fluid hydrocarbon feed can for example be obtained from a conventional crude oil (also sometimes referred to as a petroleum oil or mineral oil), an unconventional crude oil (that is, oil produced or extracted using techniques other than the traditional oil well method) or a Fisher Tropsch oil (sometimes referred to as a synthetic oil) and/or a mixture thereof.

When the biomass material is a solid biomass material, the fluid hydrocarbon feed may also be a fluid hydrocarbon feed from a renewable source, such as for example a pyrolysis oil or a vegetable oil.

In one embodiment the fluid hydrocarbon feed is derived from a, preferably conventional, crude oil. Examples of conventional crude oils include West Texas Intermediate crude oil, Brent crude oil, Dubai-Oman crude oil, Arabian Light crude oil, Midway Sunset crude oil or Tapis crude oil.

More preferably the fluid hydrocarbon feed comprises a fraction of a, preferably conventional, crude oil. Preferred fluid hydrocarbon feeds include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof, preferably derived from a conventional crude oil. Most preferably the fluid hydrocarbon feed comprises a long residue, a vacuum gas oil or a mixture thereof, preferably derived from a conventional crude oil.

In one embodiment the fluid hydrocarbon feed preferably has a 5 wt % boiling point at a pressure of 1 bar absolute (0.1 MegaPascal), as measured by means of distillation as based on ASTM D86 titled "Standard Test Method for Distillation of Petroleum Products at Atmospheric Pressure", respectively as measured by ASTM D1160 titled "Standard Test Method for Distillation of Petroleum Products at Reduced Pressure", of equal to or more than 100° C., more preferably equal to or more than 150° C. An example of such a fluid hydrocarbon feed is vacuum gas oil.

In a second embodiment the fluid hydrocarbon feed preferably has a 5 wt % boiling point at a pressure of 1 bar absolute (0.1 MegaPascal), as measured by means of distillation based on ASTM D86 titled "Standard Test Method for Distillation of Petroleum Products at Atmospheric Pressure", respectively as measured by ASTM D1160 titled "Standard Test Method for Distillation of Petroleum Products at Reduced Pressure", of equal to or more than 200° C., more preferably equal to or more than 220° C., most preferably equal to or more than 240° C. An example of such a fluid hydrocarbon feed is long residue.

In a further preferred embodiment equal to or more than 70 wt %, preferably equal to or more than 80 wt %, more preferably equal to or more than 90 wt % and still more preferably equal to or more than 95 wt % of the fluid hydrocarbon feed boils in the range from equal to or more than 150° C. to equal to or less than 600° C. at a pressure of 1 bar absolute (0.1 MegaPascal), as measured by means of a distillation by ASTM D86 titled "Standard Test Method for Distillation of Petroleum Products at Atmospheric Pressure", respectively as measured by ASTM D1160 titled "Standard Test Method for Distillation of Petroleum Products at Reduced Pressure".

The composition of the fluid hydrocarbon feed may vary widely. The fluid hydrocarbon feed may for example contain paraffins (including naphthenes), olefins and aromatics.

Preferably the fluid hydrocarbon feed comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the fluid hydrocarbon feed.

Preferably the fluid hydrocarbon feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total fluid hydrocarbon feed. By paraffins both normal-, cyclo- and branched-paraffins are understood.

In a preferred embodiment the fluid hydrocarbon feed comprises or consists of a paraffinic fluid hydrocarbon feed. By a paraffinic fluid hydrocarbon feed is herein understood a fluid hydrocarbon feed comprising in the range from at least 50 wt % of paraffins, preferably at least 70 wt % of paraffins, most preferably at least 90 wt %, up to and including 100 wt %, based on the total weight of the fluid hydrocarbon feed. For practical purposes the paraffin content of all fluid hydrocarbon feeds having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other fluid hydrocarbon feeds the paraffin content of the fluid hydrocarbon feed can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

Examples of paraffinic fluid hydrocarbon feeds include so-called Fischer-Tropsch derived hydrocarbon streams such as described in WO2007/090884 and herein incorporated by reference, or a hydrogen rich feed like hydrotreater product or hydrowax. By Hydrowax is understood the bottoms fraction of a hydrocracker. Examples of hydrocracking processes which may yield a bottoms fraction that can be used as fluid hydrocarbon feed, are described in EP-A-699225, EP-A-649896, WO-A-97/18278, EP-A-705321, EP-A-994173 and U.S. Pat. No. 4,851,109 and herein incorporated by reference.

When the biomass material is a solid biomass material, the weight ratio of fluid hydrocarbon feed to solid biomass material is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of fluid hydrocarbon feed to solid biomass material is preferably equal to or less than 99.9 to 0.1 (99.9:0.1), more preferably equal to or less than 95 to 5 (95:5). The fluid hydrocarbon feed and the solid biomass material are preferably being fed to the catalytic cracking reactor in a weight ratio within the above ranges.

The amount of solid biomass material, based on the total weight of solid biomass material and fluid hydrocarbon feed supplied to the catalytic cracking reactor, is preferably equal to or less than 30 wt %, more preferably equal to or less than 20 wt %, most preferably equal to or less than 10 wt % and even more preferably equal to or less than 5 wt %. For practical purposes the amount of solid biomass material present, based on the total weight of solid biomass material and fluid hydrocarbon feed supplied to the riser reactor, is preferably equal to or more than 0.1 wt %, more preferably equal to or more than 1 wt %.

When the biomass material comprises a pyrolysis oil, a liquefied biomass, a vegetable oil, animal fat or a mixture thereof, the feed supplied to the catalytic cracking reactor preferably comprises in the range from equal to or more than 5 wt %, more preferably equal to or more than 10 wt % to equal to or less than 100 wt %, more preferably equal to or less than 90 wt % of such pyrolysis oil, liquefied biomass, a vegetable oil, animal fat or a mixture thereof, based on the total weight of the feed.

In a preferred embodiment the fluid hydrocarbon co-feed comprises equal to or more than 8 wt % elemental hydrogen, more preferably more than 12 wt % elemental hydrogen, based on the total fluid hydrocarbon co-feed on a dry basis (i.e. on a water-free basis). A high content of elemental hydrogen, such as a content of equal to or more than 8 wt %, allows the hydrocarbon co-feed to act as a cheap hydrogen donor in the catalytic cracking process.

The catalytic cracking reactor can be any catalytic cracking reactor known in the art to be suitable for the purpose, including for example a fluidized bed reactor or a riser reactor. Most preferably the catalytic cracking reactor is a riser reactor.

Preferably this catalytic cracking reactor is part of a catalytic cracking unit, more preferably of a fluidized catalytic cracking (FCC) unit.

In one embodiment, where the biomass material is a solid biomass material, preferably a suspension of solid biomass material suspended in a fluid hydrocarbon feed is supplied to a riser reactor. Preferences for the fluid hydrocarbon feed are as described herein above.

In another preferred embodiment, the catalytic cracking reactor is a riser reactor and the solid biomass material is supplied to the riser reactor at a location downstream of a location where a fluid hydrocarbon feed is supplied to the riser reactor. Without wishing to be bound by any kind of theory it is believed that by allowing the fluid hydrocarbon co-feed to contact the catalytic cracking catalyst first, hydrogen may be generated. The availability of this hydrogen may assist in the reduction of coke formation when the solid biomass material is contacted with the catalytic cracking catalyst more downstream in the riser reactor.

In another preferred embodiment, where the biomass material is a solid biomass material, the catalytic cracking reactor is a riser reactor and the fluid hydrocarbon feed is supplied to the riser reactor at a location downstream of the location where the solid biomass material is supplied to the riser reactor.

Without wishing to be bound to any kind of theory it is believed that supplying the solid biomass material upstream of the fluid hydrocarbon feed leads to in-situ water production in the upstream part of the riser reactor, leading to lower partial hydrocarbon pressures in the upstream part of the riser reactor and higher olefins yields. In addition it is believed that it allows the solid biomass material to be converted into an intermediate oil product and allowing this intermediate oil product to be at least partly and preferably wholly vaporized before the catalytic cracking catalyst is quenched by addition of a fluid hydrocarbon feed. It is further believed that a longer residence time, higher temperature and/or high catalyst to feed weight ratio may advantageously lead to an improved conversion of the solid biomass material.

In a still further embodiment, a suspension of solid biomass material suspended in a first fluid hydrocarbon feed is supplied to the riser reactor at a first location and a second fluid hydrocarbon feed is supplied to the riser reactor at a second location downstream of the first location. Preferences for the first and second fluid hydrocarbon feed are as described herein above for the fluid hydrocarbon feed.

By a riser reactor is herein understood an elongated, preferably essentially tube-shaped, reactor suitable for carrying out catalytic cracking reactions. Suitably a fluidized catalytic cracking catalyst flows in the riser reactor from the upstream end to the downstream end of the reactor. The elongated, preferably essentially tube-shaped, reactor is preferably oriented in an essentially vertical manner. Preferably a fluidized catalytic cracking catalyst flows from the bottom of the riser reactor upwards to the top of the riser reactor.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference.

For example, the riser reactor may be a so-called internal riser reactor or a so-called external riser reactor as described therein.

By an internal riser reactor is herein preferably understood an essentially vertical, preferably essentially tube-shaped, reactor, that may have an essentially vertical upstream end located outside a vessel and an essentially vertical downstream end located inside the vessel. The vessel is suitably a reaction vessel suitable for catalytic cracking reactions and/or a vessel that comprises one or more cyclone separators and/or swirl tubes. The internal riser reactor is especially advantageous when at least part of the feed comprises a solid biomass material or a pyrolysis oil. The solid biomass material may be converted into an intermediate oil product. Without wishing to be bound to any kind of theory it is believed that an internal riser reactor may reduce polymerization of the olefins formed, thereby increasing overall olefin yield.

By an external riser reactor is herein preferably understood a riser reactor that is located outside a vessel. The external riser reactor can suitably be connected via a so-called crossover to a vessel. Preferably the external riser reactor comprises a, preferably essentially vertical, riser reactor pipe. Such a riser reactor pipe is located outside a vessel. The riser reactor pipe may suitably be connected via a, preferably essentially horizontal, downstream crossover pipe to a vessel. The downstream crossover pipe preferably has a direction essentially transverse to the direction of the riser reactor pipe. The vessel may suitably be a reaction vessel suitable for catalytic cracking reactions and/or a vessel that comprises one or more cyclone separators and/or swirl separators.

When an external riser reactor is used, it may be advantageous to use an external riser reactor with a curve or low velocity zone at its termination as for example illustrated in the Handbook titled "Fluid Catalytic Cracking technology and operations", by Joseph W. Wilson, published by PennWell Publishing Company (1997), chapter 3, FIG. 3-7, herein incorporated by reference.

The length of the riser reactor may vary widely. For practical purposes the riser reactor preferably has a length in the range from equal to or more than 10 meters, more preferably equal to or more than 15 meters and most preferably equal to or more than 20 meters, to equal to or less than 65 meters, more preferably equal to or less than 55 meters and most preferably equal to or less than 45 meters.

In a preferred embodiment the, preferably solid, biomass material is supplied to the riser reactor, at the bottom of this reactor. As explained above, this may result in in-situ water formation at the bottom of the reactor. The in-situ water formation may lower the hydrocarbon partial pressure and reduce second order hydrogen transfer reactions, thereby resulting in higher olefin yields. Preferably the hydrocarbon partial pressure is lowered to a pressure in the range from 0.7 to 2.8 bar absolute (0.07 to 0.28 MegaPascal), more preferably 1.2 to 2.8 bar absolute (0.12 to 0.28 MegaPascal).

It may be advantageous to also add a lift gas at the bottom of the riser reactor. Examples of such a liftgas include steam, vaporized oil and/or oil fractions, and mixtures thereof. Steam is most preferred as a lift gas. However, the use of a vaporized oil and/or oil fraction (preferably vaporized liquefied petroleum gas, vaporized gasoline, vaporized diesel, vaporized kerosene or vaporized naphtha) as a liftgas may have the advantage that the liftgas can simultaneously act as a hydrogen donor and may prevent or reduce coke formation. Most preferably the liftgas consists of steam.

If the biomass material is supplied at the bottom of the riser reactor, is may optionally be mixed with such a lift gas before entry in the riser reactor, and fed to the reactor as a mixture of biomass material and liftgas. If the biomass material is not mixed with the liftgas prior to entry into the riser reactor it may be fed simultaneously with the liftgas (at one and the same location) to the riser reactor, and optionally mixed upon entry of the riser reactor; or it may be fed separately from any liftgas (at different locations) to the riser reactor.

When both biomass material and steam are introduced into the bottom of the riser reactor, the steam-to-biomass material weight ratio is preferably in the range from equal to or more than 0.01:1, more preferably equal to or more than 0.05:1 to equal to or less than 5:1, more preferably equal to or less than 1.5:1.

Preferably the temperature in the reactor ranges from equal to or more than 450° C., more preferably from equal to or more than 480° C., to equal to or less than 800° C., more preferably equal to or less than 750° C.

Preferably the temperature at the location where the biomass material is supplied to the catalytic cracking reactor lies in the range from equal to or more than 500° C., more preferably equal to or more than 550° C., and most preferably equal to or more than 600° C., to equal to or less than 800° C., more preferably equal to or less than 750° C.

Preferably the pressure in the catalytic cracking reactor ranges from equal to or more than 0.5 bar absolute to equal to or less than 10 bar absolute (0.05 MegaPascal-1 MegaPascal), more preferably from equal to or more than 1.0 bar absolute to equal to or less than 6 bar absolute (0.1 MegaPascal to 0.6 MegaPascal).

Preferably the total average residence time of the biomass material lies in the range from equal to or more than 1 second, more preferably equal to or more than 1.5 seconds and even more preferably equal to or more than 2 seconds to equal to or less than 10 seconds, preferably equal to or less than 5 seconds and more preferably equal to or less than 4 seconds.

The weight ratio of catalyst to feed—herein also referred to as catalyst:feed ratio—preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

The weight ratio of catalyst to biomass material (catalyst:biomass ratio) at the location where the biomass material is supplied to the riser reactor preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

In a preferred embodiment the fluid hydrocarbon feed may be introduced to the catalytic cracking reactor at a location where the, preferably solid, biomass material already had a residence time in the range from equal to or more than 0.01 seconds, more preferably from equal to or more than 0.05 seconds, and most preferably from equal to or more than 0.1 seconds to equal to or less than 2 seconds, more preferably to equal to or less than 1 seconds, and most preferably to equal to or less than 0.5 seconds.

In a preferred embodiment the ratio between the residence time for any solid biomass material to the residence time for the fluid hydrocarbon feed (residence solid biomass:residence hydrocarbon ratio) lies in the range from equal to or more than 1.01:1, more preferably from equal to or more than 1.1:1 to equal to or less than 3:1, more preferably to equal to or less than 2:1.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MFI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

Preferably the catalytic cracking catalyst is contacted in a cocurrent flow configuration with a cocurrent flow of the, preferably solid, biomass material and optionally fluid hydrocarbon feed.

Catalytic cracking of a biomass material with a catalytic cracking catalyst as described herein is preferably carried out in a catalytic cracking unit, preferably a fluidized catalytic cracking unit.

In a preferred embodiment step a) comprises a catalytic cracking process comprising:
a catalytic cracking step comprising contacting the, preferably solid, biomass material and optionally a fluid hydrocarbon feed with the catalytic cracking catalyst at a temperature of more than 400° C. in a catalytic cracking reactor and catalytically cracking the solid, biomass material and optional fluid hydrocarbon feed to produce one or more cracked products and a coked catalytic cracking catalyst;
a separation step comprising separating the one or more cracked products from the coked catalytic cracking catalyst;
a regeneration step comprising regenerating coked catalytic cracking catalyst to produce a regenerated catalytic cracking catalyst, heat and carbon dioxide; and a recycle step comprising recycling the regenerated catalytic cracking catalyst to the catalytic cracking step.

The catalytic cracking step is preferably carried out as described herein before.

The separation step is preferably carried out with the help of one or more cyclone separators and/or one or more swirl tubes.

In addition the separation step may further comprise a stripping step. In such a stripping step the coked catalyst may be stripped to recover the products absorbed on the coked catalyst before the regeneration step. These products may be recycled and added to the cracked product stream obtained from the catalytic cracking step.

The regeneration step preferably comprises contacting of the coked catalytic cracking catalyst with an oxygen containing gas in a regenerator to generate a regenerated catalytic cracking catalyst.

The regenerated catalytic cracking catalyst can be recycled to the catalytic cracking step. In a preferred embodiment a side stream of make-up catalyst is added to the recycle stream to make-up for loss of catalyst in the reaction zone and regenerator.

When catalytically cracking the biomass material and optionally the fluid hydrocarbon feed one or more cracked products are produced.

In step b) the one or more cracked products are fractionated to obtain a fraction chosen from the group consisting of light cycle oil and naphtha products, fractions thereof and mixtures of any of these.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), chapter 8, especially pages 223 to 235, herein incorporated by reference.

The one or more cracked products are preferably obtained as gaseous cracked products. These gaseous cracked products can subsequently be separated into various gas and liquid products in one or more fractionation units.

Preferably a main fractionator is used to cool the gaseous cracked products and to condense any heavy liquid products. The main fractionator preferably comprises a distillation tower comprising a bottom section (sometimes referred to as flash zone) at the bottom of the tower; a heavy cycle oil (HCO) section, a light cycle oil (LCO) section and a top section.

In the bottom section the cracked products are preferably cooled via contact with a circulating stream of fractionator bottoms product, sometimes also referred to as a bottoms pump-around. The product obtained from the bottom section at the bottom of the distillation tower is sometimes also referred to as slurry oil. By slurry oil is herein preferably understood a fraction of the cracked products of which at least 80 wt %, more preferably at least 90 wt % boils at or above 425° C. (at a pressure of 0.1 MegaPascal).

In the heavy cycle oil (HCO) section so called heavy cycle oil may be withdrawn from the distillation tower. By heavy cycle oil is herein preferably understood a fraction of the cracked products of which at least 80 wt %, more preferably at least 90 wt % boils in the range from equal to or more than 370° C. to less 425° C. (at a pressure of 0.1 MegaPascal). In a preferred embodiment, at least part of this heavy cycle oil is advantageously recycled and used as a fluid hydrocarbon co-feed to the catalytic cracking reactor.

In the light cycle oil (LCO) section so called light cycle oil may be withdrawn from the distillation tower. By light cycle oil (LCO) is herein preferably understood a fraction of the cracked products of which at least 80 wt %, more preferably at least 90 wt % boils in the range from equal to or more than 221° C. to less than 370° C. (at a pressure of 0.1 MegaPascal). Preferably at least part of this light cycle oil may be hydrotreated by means of hydrodeoxygenation, hydrodesulphurization, hydrodenitrogenation and/or hydroisomerization to prepare one or more biofuel components that may be useful in one of the liquid fuel compositions as described herein below. Alternatively, at least part of the light cycle oil may also be withdrawn and directly used as a biofuel component.

In the top section of the distillation tower, naphtha products and so-called dry gas can be withdrawn. By naphtha products is herein preferably understood a fraction of the cracked products of which at least 80 wt %, more preferably at least 90 wt % boils in the range from equal to or more than 30° C. to less than 221° C. (at a pressure of 0.1 MegaPascal).

By dry gas is herein preferably understood a fraction consisting of compounds boiling at or below the boiling point of ethane. The dry gas may comprise for example methane, ethane, ethene, carbon-monoxide, carbon-dioxide, hydrogen and nitrogen. The naphtha products may comprise fractions that may be useful as a biofuel component for gasoline compositions and/or diesel compositions and/or kerosene compositions. Preferably the dry gas is separated from the naphtha products by means of one or more gas/liquid separator(s) and/or one or more absorber(s). Subsequently the naphtha products may be debutanized and/or depentanized, if so desired, to remove compounds boiling at or below the boiling point of butane respectively below the boiling point of pentane. If desired at least part of the, optionally debutanized and/or depentanized, naphtha products may be hydrotreated by means of hydrodeoxygenation, hydrodesulphurization, hydrodenitrogenation and/or hydroisomerization to prepare one or more biofuel components that may be useful in one of the liquid fuel compositions as described herein below.

In a preferred embodiment, however, the, optionally debutanized and/or depentanized, naphtha products are forwarded to one or more further distillation column(s). Here the, optionally debutanized and/or depentanized, naphtha products may be split up into a light-light-cycle oil fraction (LLCO, sometimes also referred to as heavycat-cracked gasoline (HCCG)); a cat-cracked gasoline fraction (CCG, sometimes also referred to as heart cut CCG); and/or a light cat-cracked gasoline fraction (LCCG, sometimes also referred to as cat-cracked tops). By a light cat-cracked gasoline fraction is herein preferably understood a fraction of the naphtha products of which at least 80 wt %, more preferably at least 90 wt % boils in the range from equal to or more than 35° C. to less than 125° C. (at a pressure of 0.1 MegaPascal). In addition, the light cat-cracked gasoline fraction preferably comprises in the range from equal to or more than 1 vol. %, more preferably equal to or more than 10 vol. % and most preferably equal to or more than 20 vol. % to equal to or less than 60 vol. %, more preferably equal to or less than 50 vol. % of C4-C8 olefins, based on the total volume of the light cat-cracked gasoline fraction. By C4-C8 olefins are herein understood olefins having in the range from equal to or more than 4 to equal to or less than 8 carbon atoms. More preferably the light cat-cracked gasoline fraction comprises in the range from equal to or more than 1 vol. %, more preferably equal to or more than 10 vol. % and most preferably equal to or more than 20 vol. % to equal to or less than 60 vol. %, more preferably equal to or less than 50 vol. % of C5-C7 olefins, based on the total volume of the light cat-cracked gasoline fraction. By C5-C7 olefins are understood olefins having in the range from equal to or more than 5 to equal to or less than 7 carbon atoms (that is by C#-compounds are understood compounds having # carbon atoms). The olefins in the light cat-cracked gasoline fraction may include mono-, di- or polyolefins. In addition the olefins in the light-cat-cracked gasoline fraction may include normal olefins and/or branched olefins. Preferably the C4-C8-olefins and/or the C5-C7-olefins comprise normal-olefins as well as branched olefins wherein the volume ratio of normal olefins to branched olefins (preferably the volume ratio of normal olefins to methyl branched olefins) is preferably equal to or less than 1:1, more preferably equal to or less than 2:3. Hence, preferably the majority (i.e. more than 50 vol. %) of the C4-C8-olefins and/or the C5-C7-olefins are branched olefins, more preferably methyl-branched olefins. Examples of the C4-C8-olefins and/or the C5-C7-olefins in light-cat-cracked gasoline include butene, pentene, pentadiene, 2-methyl-butene, 2-methyl-pentene, 3-methyl-pentene, hexene, hexadiene, 2-methyl-hexene, 3-methyl-hexene, methyl-hexadiene, heptene, heptadiene, 1-methyl-heptene, 2-methyl-heptene, 3-methyl-heptene, 4-methyl-heptene, methyl-heptadiene, octene, octadiene.

As will be discussed further below, the C4-C8-olefins and/or the C5-C7-olefins, and especially the branched C4-C8-olefins and/or the C5-C7-olefins are very useful as RON improvers and/or MON improvers in spark-ignition engines.

Preferably the light-cat-cracked gasoline fraction further comprises in the range from equal to or more than 0.02 wt % to equal to or less than 100 wt % of bio-carbon, more preferably in the range from equal to or more than 0.02 wt % to equal to or less than 90 wt % of bio-carbon based on the total weight of carbon present in the light-cat-cracked gasoline fraction.

More preferably the light-cat-cracked gasoline fraction comprises in the range from equal to or more than 0.1 wt %, more preferably equal to or more than 0.5 wt %, still more preferably equal to or more than 1 wt %, even more preferably equal to or more than 5 wt %, and most preferably equal to or more than 10 wt % to equal to or less than 50 wt %, more preferably equal to or less than 45 wt % and most preferably equal to or less than 40 wt % of bio-carbon based on the total weight of carbon present in the light-cat-cracked gasoline fraction.

For the purpose of this invention bio-carbon is understood to mean biobased carbon as determined according to ASTM test D6866-10 titled "Standard Test Methods for Determining the Biobased Content of Solid, Liquid and Gaseous samples using Radiocarbon Analysis", method B. Further carbon or elemental carbon as mentioned herein refer to carbon-atoms.

In step c) of the process according to the invention the fraction obtained in step b) is used as a biofuel component and/or converted into a biofuel component.

In a preferred embodiment the fraction obtained in step b) is the above described light cat-cracked gasoline fraction. Preferably the biofuel component comprises in the range from equal to or more than 0.1 wt %, more preferably equal to or more than 0.5 wt %, still more preferably equal to or more than 1 wt %, even more preferably equal to or more than 5 wt %, and most preferably equal to or more than 10 wt % to equal to or less than 50 wt %, more preferably equal to or less than 45 wt % and most preferably equal to or less than 40 wt % of bio-carbon based on the total weight of carbon present in the biofuel component.

If converted, the fraction obtained in step b) may for example be converted by hydrodeoxygenation, hydrodesulphurization, hydrodenitrogenation, hydrocracking and/or hydroisomerization. Preferably the fraction obtained in step b) may be converted by hydrodeoxygenation.

By hydrodeoxygenation is herein understood reducing the concentration of oxygen-containing compounds in the fraction by contacting the fraction with hydrogen in the presence of a hydrodeoxygenation catalyst. Oxygen-containing compounds that can be removed include acids, ethers, esters, ketones, aldehydes, alcohols (such as phenols) and other oxygen-containing compounds.

The hydrodeoxygenation preferably comprises contacting of the fraction with hydrogen in the presence of an hydrodeoxygenation catalyst at a temperature in the range from equal to or more than 200° C., preferably equal to or more than 250° C., to equal to or less than 450° C., preferably equal to or less than 400° C.; at a total pressure in the range of equal to or more than 10 bar absolute (1.0 MegaPascal) to equal to or less than 350 bar absolute (35 MegaPascal); and at a partial hydrogen pressure in the range of equal to or more than 2 bar absolute (0.2 MegaPascal) to equal to or less than 350 bar absolute (35 MegaPascal).

The hydrodeoxygenation catalyst can be any type of hydrodeoxygenation catalyst known by the person skilled in the art to be suitable for this purpose.

The hydrodeoxygenation catalyst preferably comprises one or more hydrodeoxygenation metal(s), preferably supported on a catalyst support.

Most preferred are hydrodeoxygenation catalysts comprising Rhodium on alumina ($Rh/Al_2O_3$), Rhodium-Cobalt on alumina ($RhCo/Al_2O_3$), Nickel-Copper on alumina ($NiCu/Al_2O_3$), Nickel-Tungsten on alumina ($NiW/Al_2O_3$), Cobalt-Molybdenum on alumina ($CoMo/Al_2O_3$) or Nickel-Molybdenum on alumina ($NiMo/Al_2O_3$).

In step d) the biofuel component obtained in step c) is blended with one or more other components to obtain a liquid fuel composition.

Examples of one or more other components with which the biofuel component may be blended include anti-oxidants, corrosion inhibitors, ashless detergents, dehazers, dyes, lubricity improvers and/or mineral fuel components, but also conventional petroleum derived gasoline, diesel and/or kerosene fractions.

Liquid Fuel Compositions

The above described method advantageously allows one to make a liquid fuel composition which can be produced and handled by the existing infrastructure and combustion technologies.

The present invention therefore also provides several novel liquid fuel compositions.

First Liquid Fuel Composition

In an embodiment of the present invention provides a liquid fuel composition comprising a biofuel component, which biofuel component comprises, consists of or is derived from a fraction of one or more cracked products produced by catalytic cracking of a biomass source, wherein the fraction is chosen from the group consisting of light cycle oil, naphtha products, fractions thereof and/or mixtures thereof.

By a biofuel component is herein understood a component that is at least party derived from a biomass material as described herein above.

Preferably the biofuel component in this first liquid fuel composition consists of a light cat-cracked gasoline fraction as described above. By a light cat-cracked gasoline fraction is herein preferably understood a fraction of the naphtha products of which at least 80 wt %, more preferably at least 90 wt % boils in the range from equal to or more than 35° C. to less than 125° C. (at 0.1 MegaPascal). Further preferences for this light cat-cracked gasoline fraction are as described herein above for the process.

Preferably the biofuel component in the first liquid fuel composition comprises equal to or more than 0.02 wt %, more preferably equal to or more than 0.1 wt %, still more preferably equal to or more than 1 wt % and most preferably equal to or more than 5 wt % of bio-carbon and/or equal to or less than 100 wt % of bio-carbon, more preferably equal to or less than 90 wt %, most preferably equal to or less than 70 wt % of bio-carbon, based on the total weight of carbon present in the biofuel component.

In one preferred embodiment the first liquid fuel composition is a gasoline composition. More preferably the first liquid fuel composition is a gasoline composition having an initial boiling point in the range of from 15° C. to 70° C. (as determined by IP123), a final boiling point of at most 230° C. (as determined by IP123), a RON in the range of from 85 to 110 (as determined by ASTM D2699) and a MON in the range of from 75 to 100 (as determined by ASTM D2700). Preferences for this gasoline composition are as described herein below for the third liquid fuel composition.

In another preferred embodiment the first liquid fuel composition is a kerosene composition having an initial boiling point in the range of from 80 to 150° C., a final boiling point in the range of from 200 to 320° C. and a viscosity at −20° C. in the range of from 0.8 to 10 $mm^2/s$ (as determined by ASTM D445). Preferences for this kerosene composition are as described herein below for the second and/or third liquid fuel composition.

In another preferred embodiment the first liquid fuel composition is a diesel fuel composition having an initial boiling point in the range of from 130° C. to 230° C. (as determined by IP123), a final boiling point of at most 410° C. (as determined by IP123) and a cetane number in the range of from 35 to 120 (as determined by ASTM D613). Preferences for this diesel fuel composition are as described herein below for the third liquid fuel composition.

Second Liquid Fuel Composition

In yet another embodiment the invention provides another liquid fuel composition, suitable for use in a spark-ignition engine, comprising in the range of 0.5 to 20 vol. % of C4-C8-olefins, which C4-C8-olefins contain in the range from equal to or more than 0.02 wt % to equal to or less than 100 wt % of bio-carbon, based on the total weight of carbon present in the C4-C8-olefins.

By C4-C8 olefins are herein understood olefins having in the range from equal to or more than 4 to equal to or less than 8 carbon atoms.

More preferably the above second liquid fuel composition is a liquid fuel composition comprising in the range from equal to or more than 1 vol. %, more preferably equal to or more than 10 vol. % and most preferably equal to or more than 20 vol. % to equal to or less than 60 vol. %, more preferably equal to or less than 50 vol. % of C5-C7 olefins, which C5-C7-olefins contain in the range from equal to or more than 0.02 wt % to equal to or less than 100 wt % of bio-carbon, based on the total weight of carbon present in the C5-C7-olefins. By C5-C7 olefins are understood olefins having in the range from equal to or more than 5 to equal to or less than 7 carbon atoms.

Preferably the second liquid fuel composition is a gasoline composition. More preferably the second liquid fuel composition is a gasoline composition having an initial boiling point in the range of from 15° C. to 70° C. (as determined by IP123), a final boiling point of at most 230° C. (as determined by IP123), a RON in the range of from 85 to 110 (as determined by ASTM D2699) and a MON in the range of from 75 to 100 (as determined by ASTM D2700).

The gasoline composition preferably comprises mixtures of hydrocarbons boiling in the range from 15 to 230° C., more preferably in the range of from 25 to 230° C. (as determined according to EN-ISO 3405). The initial boiling point of the gasoline compositions preferably lies in the range of from 15 to 70° C. (as determined according to IP123), more preferably in the range of from 20 to 60° C., most preferably in the range of from 25 to 50° C. The final boiling point of the gasoline compositions preferably is at most 230° C., more preferably at most 220° CC, most preferably at most 210° C.

Preferably, the RON of the gasoline composition will be at least 90, for instance in the range of from 90 to 110, more preferably at least 91, for instance in the range of from 91 to 105, even more preferably at least 92, for instance in the range of from 92 to 103, even more preferably at least 93, for instance in the range of from 93 to 102, and most preferably at least 94, for instance in the range of from 94 to 100.

Preferably, the MON of the gasoline composition will be at least 80, for instance in the range of from 80 to 100, more preferably at least 81, for instance in the range of from 81 to 95, even more preferably at least 82, for instance in the range of from 82 to 93, even more preferably at least 83, for instance in the range of from 83 to 92, and most preferably at least 84, for instance in the range of from 84 to 90.

The gasoline composition preferably has a low or ultra low sulphur content, for instance at most 1000 ppmw (parts per million by weight), preferably no more than 500 ppmw, more preferably no more than 100, even more preferably no more than 50 and most preferably no more than even 10 ppmw.

The gasoline composition also preferably has a low total lead content, such as at most 0.005 g/l, most preferably being lead free—having no lead compounds added thereto (i.e. unleaded).

Preferably the C4-C8 olefins in the second liquid fuel composition were obtained from or derived from a light cat-cracked gasoline fraction as described above. More preferably the second liquid fuel composition comprises such a light cat-cracked gasoline fraction.

Preferably the second liquid fuel composition comprises equal to or more than 1 vol. %, more preferably equal to or more than 5 vol. % and/or equal to or less than 18 vol. %, more preferably equal to or less than 15 vol. % of the C4-C8-olefins, based on the total volume of second liquid fuel composition.

More preferably the second liquid fuel composition comprises equal to or more than 0.5 vol. %, more preferably equal to or more than 1 vol. %, more preferably equal to or more than 5 vol. % and/or equal to or less than 20 vol. %, more preferably equal to or less than 18 vol. %, more preferably equal to or less than 15 vol. % of C5-C7-olefins, based on the total volume of second liquid fuel composition.

The C4-C8-olefins and/or the C5-C7-olefins in the second liquid fuel composition may include mono-, di- or polyolefins. In addition the C4-C8-olefins and/or the C5-C7-olefins may include normal olefins and/or branched olefins. Preferably the C4-C8-olefins and/or the C5-C7-olefins comprise normal-olefins as well as branched olefins wherein the volume ratio of normal olefins to branched olefins (preferably the volume ratio of normal olefins to methyl branched olefins) is preferably equal to or less than 1:1, more preferably equal to or less than 2:3. Hence, preferably the majority (i.e. more than 50 vol. %) of the C4-C8-olefins and/or the C5-C7-olefins are branched olefins, more preferably methyl-branched olefins. Examples of the C4-C8-olefins and/or the C5-C7-olefins in the second liquid fuel composition include butene, pentene, pentadiene, 2-methyl-butene, 2-methyl-pentene, 3-methyl-pentene, hexene, hexadiene, 2-methyl-hexene, 3-methyl-hexene, methyl-hexadiene, heptene, heptadiene, 1-methyl-heptene, 2-methyl-heptene, 3-methyl-heptene, 4-methyl-heptene, methyl-heptadiene, octene, octadiene.

The C4-C8-olefins and/or the C5-C7-olefins, and especially the branched C4-C8-olefins and/or the C5-C7-olefins are very useful as RON improvers and/or MON improvers in spark-ignition engines.

Preferably the C4-C8-olefins and/or the C5-C7-olefins in the second liquid fuel composition comprise equal to or more than 0.02 wt %, more preferably equal to or more than 0.1 wt %, still more preferably equal to or more than 1 wt % and most preferably equal to or more than 5 wt % of bio-carbon and/or equal to or less than 100 wt % of bio-carbon, more preferably equal to or less than 90 wt %, most preferably equal to or less than 70 wt % of bio-carbon, based on the total weight of carbon present in the such olefins.

Further preferences for the second liquid fuel composition are as described under "Further details for the first, second and third liquid fuel compositions" herein below.

Third Liquid Fuel Composition

In yet another embodiment the present invention provides another liquid fuel composition comprising
i) a conventional fuel component
ii) a biofuel component comprising
from equal to or more than 0.01 wt % to equal to or less than 80 wt % olefins;
from equal to or more than 0.01 wt % to equal to or less than 20 wt % C4+ oxygen-containing hydrocarbons;
from equal to or more than 5 wt % to equal to or less than 80 wt % linear or branched paraffins;
from equal to or more than 0.01 wt % to equal to or less than 80 wt % cycloparaffins;

from equal to or more than 0.01 wt % to equal to or less than 80 wt % aromatics, based on the total weight of the biofuel component;

which biofuel component comprises in the range from equal to or more than 0.02 wt % to equal to or less than 50 wt % of bio-carbon, based on the total weight of carbon present in the biofuel component.

By a biofuel component is herein understood a component that is at least party derived from a biomass material as described herein above.

The biofuel component preferably comprises from equal to or more than 5 vol. % olefins, more preferably 10 wt % olefins, more preferably from equal to or more than 15 wt % or even 20 wt % olefins to preferably equal to or less than 60 wt % olefins, more preferably to equal to or less than 50 wt % olefins, based on the total weight of the biofuel component. The olefins may comprise olefins comprising one or more unsaturated carbon-carbon bonds. The olefins can further be linear, cyclic or branched. Preferably the olefins comprise equal to or more than 4 carbon atoms, more preferably equal to or more than 5 carbon atoms and/or equal to or less than 8 carbon atoms, more preferably equal to or less than 7 carbon atoms.

The biofuel component further comprises preferably from equal to or more than 10 wt % linear and/or branched paraffins, more preferably from equal to or more than 15 wt % linear and/or branched paraffins, to preferably equal to or less than 70 wt % linear and/or branched paraffins, more preferably to equal to or less than 60 wt % linear and/or branched paraffins, most preferably equal to or less than 50 wt % linear and/or branched paraffins, based on the total weight of the biofuel component.

The biofuel component further comprises preferably from equal to or more than 2 wt %, more preferably equal to or more than 4 wt % of cycloparraffins to preferably equal to or less than 40 wt %, more preferably equal to or less than 30 wt % cycloparaffins.

The biofuel component further comprises preferably from equal to or more than 15 wt %, more preferably equal to or less than 20 wt % and most preferably equal to or more than 25 wt % to preferably equal to or less than 75 wt % aromatics, more preferably equal to or less than 70 wt % of aromatics based on the total weight of the biofuel component.

The biofuel component further comprises preferably from equal to or more than 0.01 wt %, more preferably equal to or more than 0.1 wt %, and most preferably equal to or more than 1 wt % of C4+ oxygen-containing hydrocarbons to preferably equal to or less than 20 wt %, more preferably equal to or less than 10 wt % C4+ oxygen-containing hydrocarbons. Preferably the C4+ oxygen-containing hydrocarbons are C5+ oxygen-containing hydrocarbons, more preferably C6+ oxygen-containing hydrocarbons.

By C4+ respectively C5+ respectively C6+ oxygen-containing hydrocarbons are herein understood oxygen-containing hydrocarbons comprising equal to or more than 4, respectively equal to or more than 5, respectively equal to or more than 6 carbon atoms. Examples of such oxygen-containing hydrocarbons include alcohols, such as pentanols, hexanols and/or phenols; esters; ethers; and mixtures thereof.

The biofuel component further preferably comprises in the range from equal to or more than 0.1 wt %, more preferably equal to or more than 0.5 wt %, still more preferably equal to or more than 1 wt %, even more preferably equal to or more than 5 wt %, and most preferably equal to or more than 10 wt % to equal to or less than 45 wt %, more preferably equal to or less than 40 wt % and most preferably equal to or less than 35 wt % of bio-carbon based on the total weight of carbon present in the biofuel component.

In a preferred embodiment the third liquid fuel composition is a gasoline composition having an initial boiling point in the range of from 15° C. to 70° C. (as determined by IP123), a final boiling point of at most 230° C. (as determined by IP123), a RON in the range of from 85 to 110 (as determined by ASTM D2699) and a MON in the range of from 75 to 100 (as determined by ASTM D2700). Further preferences for this gasoline composition are the same as those described for the gasoline composition under the second liquid fuel composition.

In another preferred embodiment the third liquid fuel composition is a kerosene composition having an initial boiling point in the range of from 80 to 150° C., a final boiling point in the range of from 200 to 320° C. and a viscosity at −20° C. in the range of from 0.8 to 10 mm$^2$/s (as determined by ASTM D445).

The kerosene fuel compositions may preferably have boiling points within the range of 80 to 320° C., preferably in the range of 110 to 320° C., more preferably in the range of from 130 to 300° C. The kerosene fuel compositions may further preferably have a density from 775 to 845 kg/m$^3$, preferably from 780 to 830 kg/m$^3$, at 15° C. (e.g. ASTM D4502 or IP 365). The kerosene fuel compositions may preferably have an initial boiling point in the range 80 to 150° C., more preferably in the range 110 to 150° C., and preferably a final boiling point in the range 200 to 320° C. The kerosene fuel compositions may preferably have a kinematic viscosity at −20° C. (ASTM D445) in the range of from 0.8 to 10 mm$^2$/s, more preferably from 1.2 to 8.0 mm$^2$/s. The kerosene fuel composition preferably contains no more than 3000 ppmw sulphur, more preferably no more than 2000 ppmw, or no more than 1000 ppmw, or no more than 500 ppmw sulphur.

The kerosene fuel composition can advantageously be used in a jet engine.

In another preferred embodiment the third liquid fuel composition is a diesel fuel composition having an initial boiling point in the range of from 130° C. to 230° C. (as determined by IP123), a final boiling point of at most 410° C. (as determined by IP123) and a cetane number in the range of from 35 to 120 (as determined by ASTM D613).

The diesel fuel composition preferably comprises mixtures of hydrocarbons boiling in the range from 130 to 410° C., more typically in the range of from 150 to 400° C. The initial boiling point of the diesel fuel compositions preferably lies in the range of from 130 to 230° C. (IP123), preferably in the range of from 140 to 220° C., more preferably in the range of from 150 to 210° C. The final boiling point of the diesel fuel compositions preferably is at most 410° C., more preferably at most 405° C., most preferably at most 400° C.

The diesel fuel composition preferably has a density from 750 to 1000 kg/m$^3$, preferably from 780 to 860 kg/m$^3$, at 15° C. (e.g. ASTM D4502 or IP 365) and a cetane number (ASTM D613) of from 35 to 120, more preferably from 40 to 85. The diesel fuel composition preferably has a kinematic viscosity at 40° C. (ASTM D445) from 1.2 to 4.5 mm$^2$/s.

Further Details for the First, Second and Third Liquid Fuel Compositions

For the purpose of this invention bio-carbon is understood to mean biobased carbon as determined according to ASTM test D6866-10 titled "Standard Test Methods for Determining the Biobased Content of Solid, Liquid and Gaseous samples using Radiocarbon Analysis", method B. Further "carbon" or "elemental carbon" as mentioned herein refer to "carbon-atoms".

In addition to the biofuel component, respectively the C4-C8-olefins and/or C5-C7-olefins, the first, second and third liquid fuel compositions according to the invention may also comprises a conventional fuel component (herein also sometimes referred to as base fuel component).

The conventional fuel component may be produced by any means known in the art. By a conventional fuel component is preferably understood a fuel component not derived from a biomass material. More preferably a conventional fuel component is herein understood to refer to a fuel component that is not obtained from a renewable source.

The conventional fuel component is preferably a fuel component that may be derived in any known manner from, preferably petroleum based, straight-run gasoline, synthetically-produced aromatic hydrocarbon mixtures, thermally or catalytically cracked hydrocarbons, hydro-cracked petroleum fractions, catalytically reformed hydrocarbons or mixtures of these.

Suitably, a conventional fuel component may comprise a mixture of components selected from one or more of the following groups; saturated hydrocarbons, olefinic hydrocarbons, aromatic hydrocarbons, and oxygenated hydrocarbons.

Preferably the conventional fuel component comprises linear, branched and/or cyclic paraffins and optionally in addition olefins and aromatics.

Preferably the conventional fuel component may comprise in the range of from 0 to 40 wt % olefins more preferably from 0 to 30 wt % olefins, even more preferably, in the range of from 0 to 20 wt % olefins based on the total weight of conventional fuel component.

Preferably the conventional fuel component may comprise in the range of from 0 to 70 wt % aromatics more preferably from 10 to 60 wt % aromatics, even more preferably, in the range of 10 to 50 wt % aromatics based on the total weight of conventional fuel component.

The benzene content of the conventional fuel component for the gasoline composition is preferably at most 10 wt %, more preferably at most 5 wt %, most preferably at most 1 wt % based on the total weight of conventional fuel component.

When the conventional fuel component contains oxygen-containing hydrocarbons, it preferably contains oxygen containing hydrocarbons comprising equal to or less than 5 carbon atoms. The oxygen-containing hydrocarbons are preferably present in the range from equal to or more than 0.5, 1.0 or 2.0 wt % to equal to or less than 30, 20, 15 or 10 wt %, based on the total weight of conventional fuel component. Examples of oxygen-containing hydrocarbons include alcohols such as methanol, ethanol, propanol, isopropanol, butanol, tert-butanol and isobutanol; ethers such as methyl-tert-butyl ether; and esters. A preferred oxygen-containing hydrocarbon is ethanol.

If a conventional fuel component is present in the first, second and/or third liquid fuel composition, for example in addition to the biofuel component, the conventional fuel component is preferably the main component in the liquid fuel composition, that is, the liquid fuel composition preferably comprises at least 50 vol. % of conventional fuel component, based on the total volume of the liquid fuel composition. Suitably the volume ratio of the biofuel component, respectively the C4-C8-olefins and/or the C5-C7-olefins, to the conventional fuel component preferably lies in the range of 5:95 to 95:5, more preferably in the range of 5:95 to 50:50, most preferably in the range from 5:95 to 30:70.

In addition to the conventional fuel component and the biofuel component, respectively the C4-C8-olefins and/or the C5-C7-olefins, it may be desirable for the first, second and/or third liquid fuel composition to contain a Fischer-Tropsch derived fuel component. If the liquid fuel composition does contain a Fischer-Tropsch derived fuel component, it preferably contains equal to or more than 1 wt %, more preferably equal to or more than 5% wt %, and most preferably equal to or more than 10 wt % and preferably equal to or less than 60 wt %, more preferably equal to or less than 50 wt % and most preferably equal to or less 40 wt % of a Fischer-Tropsch derived fuel component, based on the total weight of the liquid fuel composition.

By "Fischer-Tropsch derived fuel component" is meant that the fuel component is, or is derived from, a synthesis product of a Fischer-Tropsch condensation process. The Fischer-Tropsch reaction converts carbon monoxide and hydrogen into longer chain, usually paraffinic, hydrocarbons:

$$n(CO+2H_2) = (-CH_2-)_n + nH_2O + \text{heat},$$

in the presence of a Fisher-Tropsch catalyst (for example a catalyst comprising a metal from group VIII of the periodic table, preferably a catalyst comprising ruthenium, iron, cobalt, nickel or mixtures thereof) and preferably at elevated temperatures (for example in the range from 125 to 300° C., preferably from 175 to 250° C.) and/or pressures (for example 500 to 10000 kPa, preferably 1200 to 5000 kPa). Hydrogen to carbon monoxide (H2:CO) ratios other than 2:1 may be used if desired (for example a H2:CO ratio of equal to or less than 2, more preferably equal to or less than 1.75 and most preferably a H2:CO ratio in the range from 0.4 to 1.5)

The carbon monoxide and hydrogen may themselves be derived from organic or inorganic, natural or synthetic sources, typically either from natural gas or from organically derived methane.

The Fisher Tropsch derived fuel component may be obtained directly from this reaction, or indirectly for instance by fractionation of the Fischer-Tropsch synthesis product or from a hydrotreated Fischer-Tropsch synthesis product.

Suitably, the Fischer-Tropsch derived fuel component may comprise at least 90 wt %, preferably at least 95 wt %, more preferably at least 98 wt %, even more preferably at least 99 wt %, most preferably at least 99.8 wt %, of paraffins, most preferably normal and iso-paraffins.

The Fischer-Tropsch derived fuel component preferably has essentially no, or undetectable levels of, sulphur and nitrogen. The aromatics content of a Fischer-Tropsch fuel component, as determined by ASTM D4629, is preferably equal to or less than 5 wt %, more preferably equal to or less than 2 wt %, and still more preferably equal to or less than 1% w and most preferably equal to or less than 0.2 wt %, based on the total weight of Fisher-Tropsh fuel component.

The Fischer-Tropsch derived fuel component preferably has a density from 730 to 770 kg/m$^3$ at 15° C.; a kinematic viscosity from 1.2 to 6, preferably from 2 to 5, more preferably from 2 to 3.5, mm$^2$/s at −20° C.; and a sulphur content of 20 ppmw (parts per million by weight) or less, preferably of 5 ppmw or less.

In addition to the conventional fuel component, the biofuel component, respectively the C4-C8-olefins and/or C5-C7-olefins, and optionally the Fischer-Tropsch derived fuel component, the first, second and/or third liquid fuel composition according to the invention may conveniently include one or more fuel additive(s). Suitable fuel additives that can be included in the liquid fuel compositions include anti-oxidants, corrosion inhibitors, detergents, dehazers, antiknock additives, metal deactivators, valve-seat recession protectant compounds, dyes, friction modifiers, lubricity improvers, carrier fluids, diluents and markers.

Conveniently, the fuel additives can be blended with one or more diluents or carrier fluids, to form an additive concentrate, the additive concentrate can then be admixed with the fuel composition of the present invention.

The concentration of any additives present in the liquid fuel composition of the present invention is preferably up 3 percent by weight, more preferably in the range from 5 to 5000 ppmw, even still to 1 percent by weight, more preferably in the range from 5 to 1000 ppmw, advantageously in the range of from 75 to 300 ppmw, such as from 95 to 150 ppmw.

Any fuel additives, diluents and/or carrier fluids known to the person skilled in the art to be useful for this purpose in gasoline compositions, diesel fuel compositions and/or kerosene fuel compositions can be used. Examples are for example provided in WO2010/028206, which examples of fuel additives, diluents and/or carrier fluids are herein incorporated by reference.

Phenolic Anti-Oxidant

In one preferred embodiment the first, second and/or third liquid fuel composition comprises an phenolic antioxidant, which phenolic antioxidant comprises phenol and/or one or more alkyl-substituted phenols, which phenol and/or one or more alkyl-substituted phenols comprise in the range from equal to or more than 0.02 wt % to equal to or less than 100 wt % of bio-carbon, based on the total weight of carbon present in the phenol and/or one or more alkyl-substituted phenols. Such phenolic antioxidant may conveniently be comprised in the biofuel component and may be produced simultaneously with the biofuel component by the process described herein.

As the use and production of such a biomass derived antioxidant is novel and inventive, the present invention also provides a phenolic antioxidant comprising phenol and/or one or more alkyl-substituted phenols, which biological phenolic antioxidant comprises in the range from equal to or more than 0.02 wt % to equal to or less than 100 wt % of bio-carbon, based on the total weight of carbon present in the phenolic antioxidant.

Preferably the one or more alkyl-substituted phenols are chosen from the group consisting of mono-alkyl-phenols, such as 2-methyl-phenol, 2-ethyl-phenol, 3-methyl-phenol and 4-methylphenol; dialkyl-phenols such as 2,5-dimethyl-phenol, 2,4-dimethyl-phenol, 2,3-dimethyl-phenol, 3,5-dimethyl-phenol, 2,6-di-t-butylphenol; polyalkyl-phenols such as 2,6-di-t-butyl-4-methylphenol (also known as BHT) and 2,4-dimethyl-6-t-butylphenol.

As indicated above, preferably the phenolic antioxidant is at least partly produced by contacting a solid biomass material or a pyrolysis oil with a catalytic cracking catalyst at a temperature of more than 400° C. in a catalytic cracking reactor.

The present invention further provides the novel and inventive use of the above phenolic antioxidant in a liquid fuel composition comprising one or more liquid fuel components in addition to the phenolic antioxidant. Preferably the liquid fuel composition is a first, second and/or third liquid fuel composition as described above.

The present invention further provides the novel and inventive liquid fuel composition comprising
i) a conventional fuel component
ii) a phenolic antioxidant as described above. The conventional fuel component is preferably as described above for the first, second and/or third liquid fuel composition.

Preferably the phenol and/or one or more alkyl-substituted phenols are present in the liquid fuel composition in a concentration from equal to more than 100 to equal or less than 10,000 ppmw, relative to the total weight of the liquid fuel composition.

Operating the Liquid Fuel Composition in an Engine or Heating Appliance

The liquid fuel compositions according to the invention can advantageously be used in an engine or in a heating appliance.

Therefore the present invention provides a process for operating an engine, which process involves introducing into a combustion chamber of the engine a liquid fuel composition as described herein before and operating or running such engine.

The present invention further provides a process for operating a heating appliance provided with a burner, which process comprises supplying to the burner a liquid fuel composition as described herein before and burning said liquid fuel composition.

What is claimed is:

1. A liquid fuel composition, suitable for use in a spark-ignition engine, comprising: in the range of 0.5 to 20 vol. % of C4-C8-olefins, which C4-C8-olefins contain in the range from equal to or more than 0.02 wt % to equal to or less than 100 wt % of bio-carbon, based on the total weight of carbon present in the C4-C8-olefins.

2. The liquid fuel composition of claim 1, wherein the C4-C8 olefins in the liquid fuel composition were obtained from or derived from a light cat-cracked gasoline fraction.

3. The liquid fuel composition of claim 1, wherein the liquid fuel composition is a gasoline composition having an initial boiling point in the range of from 15° C. to 70° C. (as determined by IP123), a final boiling point of at most 230° C. (as determined by IP123), a RON in the range of from 85 to 110 (as determined by ASTM D2699) and a MON in the range of from 75 to 100 (as determined by ASTM D2700).

4. The liquid fuel composition of claim 1, wherein more than 50 vol. % of the C4-C8-olefins are branched olefins.

5. The liquid fuel composition of claim 1, wherein the liquid fuel composition also comprises a conventional fuel component.

6. The liquid fuel composition of claim 1, wherein the liquid fuel composition further includes one or more fuel additive(s) selected from the group consisting of anti-oxidants, corrosion inhibitors, detergents, dehazers, antiknock additives, metal deactivators, valve-seat recession protectant compounds, dyes, friction modifiers, lubricity improvers, carrier fluids, diluents and markers.

7. A liquid fuel composition comprising:
i) a conventional fuel component
ii) a biofuel component comprising:
from equal to or more than 0.01 wt % to equal to or less than 80 wt % olefins;
from equal to or more than 0.01 wt % to equal to or less than 20 wt % C4+ oxygen-containing hydrocarbons;
from equal to or more than 5 wt % to equal to or less than 80 wt % linear or branched paraffins;
from equal to or more than 0.01 wt % to equal to or less than 80 wt % cycloparaffins;
from equal to or more than 0.01 wt % to equal to or less than 80 wt % aromatics, based on the total weight of the biofuel component;
which biofuel component comprises in the range from equal to or more than 0.02 wt % to equal to or less than 50 wt % of bio-carbon, based on the total weight of carbon present in the biofuel component.

8. The liquid fuel composition of claim 7, wherein the biofuel component is at least partly produced by contacting a biomass material with a catalytic cracking catalyst at a temperature of more than 400° C. in a catalytic cracking reactor.

9. A liquid fuel composition comprising: a biofuel component, which biofuel component derived from a fraction of one or more cracking products produced by catalytic cracking of a biomass source, wherein the fraction comprises at least one of light cycle oil, naphtha products, and fractions thereof; wherein the biofuel component comprises equal to or more than 0.02 wt % to less than 100 wt % of bio-carbon, based on the total weight of carbon present in the biofuel component.

10. The liquid fuel composition of claim 1, further comprising a Fisher-Tropsch fuel component.

11. The liquid fuel composition of claim 1, further comprising a phenolic antioxidant, which phenolic antioxidant comprises at least one of phenol and one or more alkyl-substituted phenols, wherein the at least one of phenol and one or more alkyl-substituted phenols comprises in the range from equal to or more than 0.02 wt % to equal to or less than 100 wt % of bio-carbon.

12. A liquid fuel composition comprising:
i) at least 50 vol. % of a conventional fuel component not derived from a biomass material, based on the total volume of the liquid fuel composition;
ii) a phenolic antioxidant, which phenolic antioxidant comprises at least one of phenol and one or more alkyl-substituted phenols, wherein the at least one of phenol and one or more alkyl-substituted phenols comprise in the range from equal to or more than 0.02 wt % to equal to or less than 100 wt % of bio-carbon.

13. A process for operating an engine comprising:
(a) introducing into a combustion chamber of the engine a liquid fuel composition of claim 1; and
(b) operating said engine.

14. A process for operating an engine comprising:
(a) introducing into a combustion chamber of the engine a liquid fuel composition of claim 12; and
(b) operating said engine.

* * * * *